United States Patent
Stamenic et al.

(10) Patent No.: US 6,690,590 B2
(45) Date of Patent: Feb. 10, 2004

(54) APPARATUS FOR REGULATING THE DELIVERY OF POWER FROM A DC POWER SOURCE TO AN ACTIVE OR PASSIVE LOAD

(76) Inventors: Ljubisav S. Stamenic, British Columbia Institute of Technology, 3700 Willingdon Avenue, Burnaby, British Columbia (CA), V5G 3H2; Matthew R. E. Greig, British Columbia Institute of Technology, 3700 Willingdon Avenue, Burnaby, British Columbia (CA), V5G 3H2

(*) Notice: Subject to any disclaimer, the term of this patent is extended or adjusted under 35 U.S.C. 154(b) by 0 days.

(21) Appl. No.: 10/025,397

(22) Filed: Dec. 26, 2001

(65) Prior Publication Data

US 2003/0117822 A1 Jun. 26, 2003

(51) Int. Cl.[7] ................................................ H02M 5/42
(52) U.S. Cl. ....................................................... 363/89
(58) Field of Search ............................ 363/132, 98, 97, 363/95, 127, 131, 17, 26; 323/299, 906, 274, 282, 284

(56) References Cited

U.S. PATENT DOCUMENTS 4,390,940 A * 6/1983 Corbefin et al. ............. 363/132
5,327,071 A * 7/1994 Fredreick et al. ........... 323/299

* cited by examiner

Primary Examiner—Rajnikant B. Patel
(74) Attorney, Agent, or Firm—Lance A. Turlock

(57) ABSTRACT

Apparatus for regulating the delivery of power from a DC power source (for example, a solar array) to a load by dynamically and accurately tracking the maximum power point ("MPP") of the source includes a switch mode DC—DC power supply ("SMPS"), a voltage sensor operatively connected to the output of the power supply, a current sensor operatively connected to the output of the power supply, and a controller for providing a pulse width modulation (PWM) signal to the power supply. The load may be a battery or, if not a battery either a relatively low impedance load or a relatively high impedance load. The PWM signal has a controllable pulse width or PWM on-time. Depending upon sensed load characteristics, the apparatus utilizes measured signals from the voltage sensor or from the current sensor to achieve MPP tracking.

4 Claims, 9 Drawing Sheets

VOLTAGE MPPT ALGORITHM

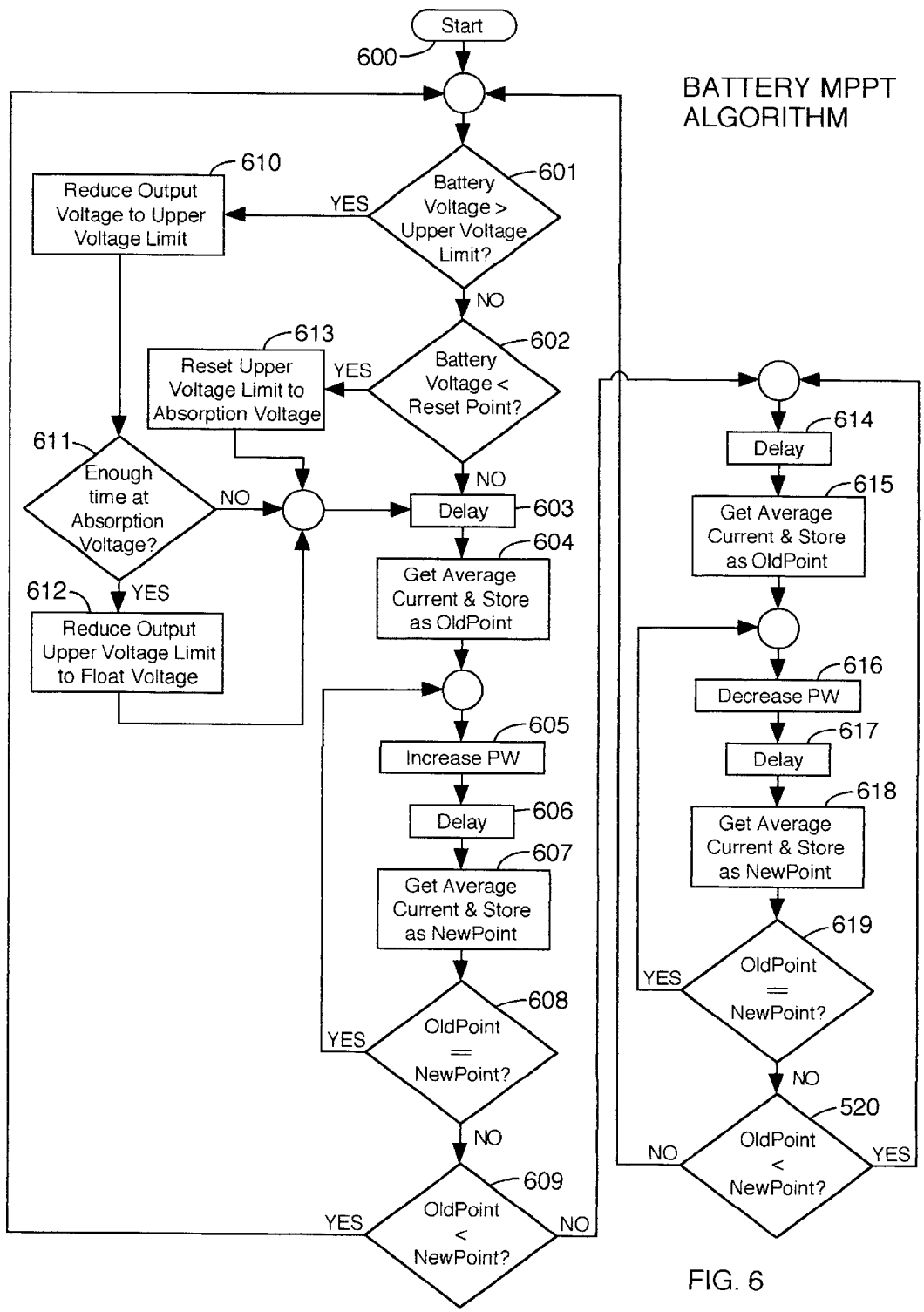

APPARATUS FOR REGULATING THE DELIVERY OF POWER FROM A DC POWER SOURCE TO AN ACTIVE OR PASSIVE LOAD

BACKGROUND OF THE INVENTION

The present invention relates to apparatus for regulating the delivery of power from a DC power source to a passive load such as a resistive load or to an active load such as a battery. It is considered particularly suitable for but not limited to applications where it is desired to operate a DC power source such as a solar array at or about its maximum power point.

A variety of systems have been designed to operate DC power sources at or near their maximum power point ("MPP") with maximum power point tracking ("MPPT"). However, existing designs have been found to have various limitations. In some cases, designs are based upon an assumed set of operating conditions that may not always exist and they are not well adapted to adjust to differing operating conditions. For example, some solar array modules require the user to manually set what voltage the MPP should be at. Typically the voltage may be rated at 25° C. However, for differing illumination levels or when the array is heated up, the required voltage can change quite significantly. In other cases, designs may not be well adapted to handle differing types of loads.

Many designs require the concurrent measurement and processing of both current and voltage parameters from which the calculation of power values are then performed to direct MPPT. The need for such calculations can be considered undesirable because they add to complexity and can slow system performance and accuracy.

A primary object of the present invention is to provide new and improved apparatus for regulating the delivery of power from a DC power source to a load while dynamically and accurately tracking the MPP of the source under a wide range of operating conditions.

A further object of the present invention is to provide new and improved apparatus of the foregoing type which requires the measurement of either output voltage to the load or output current to the load, but not both, to achieve MPPT.

BRIEF SUMMARY OF THE INVENTION

In a broad aspect of the present invention, there is provided apparatus for regulating the delivery of power from a DC power source (for example, a solar array) to a load, such apparatus including a switch mode DC—DC power supply ("SMPS"), a voltage sensor operatively connected to the output of the power supply, a current sensor operatively connected to the output of the power supply, and a controller for providing a pulse width modulation (PWM) signal to the power supply. The PWM signal has a controllable pulse width or PWM on-time.

The power supply, which is controllable in response to the PWM signal, includes an input connectable with the source for receiving power from the source, an output connectable with the load for delivering power to the load and a PWM input for receiving the PWM signal.

The voltage sensor provides a first control signal corresponding to the voltage sensed at the power supply output. Similarly, the current sensor provides a second control signal corresponding the current sensed at the power supply output.

The controller is operatively connected to the PWM input of the power supply and to the sensors for receiving the first and second control signals and for providing the PWM signal to said power supply. It includes:

selection means for selecting whether to control the power supply by tracking output voltage or by tracking output current;

signal processing means for repetitively computing from the first control signal an average voltage value representative of average voltage at the output of the power supply;

means for comparing the average voltage value as computed on each repetition with the average voltage value as computed on each immediately preceding repetition;

signal processing means for repetitively computing from the second control signal an average current value representative of average current at the output of the power supply;

means for comparing the average current value as computed on each repetition with the average current value as computed on each immediately preceding repetition;

means responsive when the selection means has selected output voltage tracking for increasing the PWM on-time if the average voltage value as computed on a given repetition is greater than the average voltage value as computed on an immediately preceding repetition, and for decreasing said PWM on-time if the average voltage value as computed on a given repetition is less than the average voltage value as computed on an immediately preceding repetition; and, means responsive when the selection means has selected output current tracking for increasing said PWM on-time if the average current value as computed on a given repetition is greater than the average current value as computed on an immediately preceding repetition, and for decreasing said PWM on-time if the average current value as computed on a given repetition is less than the average current value as computed on an immediately preceding repetition.

The foregoing apparatus provides MPPT operation which serves to maximize the output power from the power supply to the load. By maximizing the output power (which is the real object of MPPT operation), the input power from the DC power source is inherently maximized. Hence, the apparatus serves to operate the DC power source at or about its maximum power point.

It will be noted that advantageously only one of the output parameters (output voltage or output current) needs to be tracked. The decision as to which parameter to track is made by the selection means. If the load is a battery or a relatively low impedance load, then output current preferably is selected and tracked because output current will be dominant output parameter. Similarly, if the load is a relatively high impedance load, then output voltage preferably is selected and tracked because output voltage will be the dominant parameter.

Further, the monitoring of power supply output parameters as opposed to power supply input parameters avoids the need to actually calculate the power level. If control was based upon power supply input parameters, then MPPT operation would require both input current and input voltage to be tracked and multiplied thereby complicating and slowing the process, and leading to potential inaccuracies.

In a preferred embodiment, the controller includes means for computing from the first control signal a first normalized value representative of the power supply output voltage, means for computing from the second control signal a second normalized value representative of the power supply output current, and means for comparing the first and second normalized values. If the load is a battery, the selection means is operative to select output current tracking and the comparison of normalized values need not be made. However, if the load is not a battery, then the selection means is responsive to the comparison to select output voltage tracking if the first normalized value is greater than the second normalized value, and to select output current tracking if the first normalized value is less than the second normalized value. As discussed below in more detail, the base of normalization for output voltage is the maximum rated voltage that the power supply is designed to deliver. Similarly, the base of normalization for output current is the maximum rated current that the power supply is designed to deliver.

The foregoing and other features and advantages of the present invention will now be described with reference to the drawings.

BRIEF DESCRIPTION OF THE SEVERAL VIEWS OF THE DRAWING

FIG. 6 is a flow chart illustrating a battery charging algorithm performed by the controller shown in FIG. 1.

DETAILED DESCRIPTION OF THE INVENTION

Introduction

Figure 1:
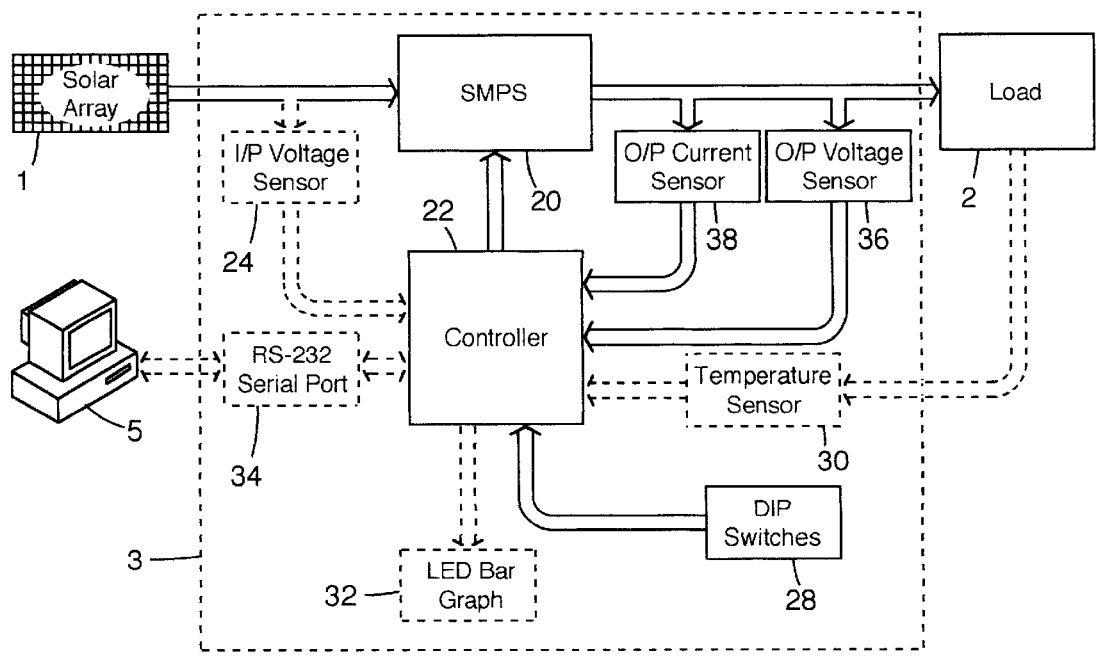
FIG. 1 is a block diagram of a system which includes apparatus in accordance with the present invention for controlling the delivery of power from a solar array to a load.

The system shown in FIG. 1 comprises a solar array 1, a load 2, control apparatus 3 for controlling the delivery of power from the solar array to the load, and a computer 5. FIG. 2 is a detailed circuit diagram of control apparatus 3. In addition to features that enable its control function, and as is described below in more detail, apparatus 3 also includes certain ancillary features the purpose of which is to provide a user interface.

Load 3 may be either a passive load such as a resistive load or an active load such as a battery. In the present embodiment, it is assumed by way of example that if load 3 is a battery then it is a lead acid battery.

As shown in FIG. 1, control apparatus 3 includes a DC—DC switch mode power supply ("SMPS") 20 having a pulse width output controllable in response to a pulse width modulation ("PWM") signal generated by controller 22. SMPS 20 includes a power input connected with solar array 2 for receiving power from the array, a power output connected with load 3 for delivering power to the load, and a PWM input connected to controller 22 for receiving the PWM signal.

Controller 22 contains the heart of control apparatus 3. In operation, it performs all relevant tasks utilizing built-in analog to digital converters, a built-in memory, a built in processor which is programmed to execute various algorithms, and a built-in PWM module which generates the desired PWM signal in response to program execution. As discussed below, the algorithms include a "Start-Up Algorithm", an algorithm for tracking the output current of SMPS 20 ("Current MPPT Algorithm"), an algorithm for tracking the output voltage of SMPS 20 ("Voltage MPPT Algorithm"), and a battery charging algorithm ("Battery MPPT Algorithm")

Control apparatus 3 further includes an input voltage sensor 24, an output voltage sensor 36, an output current sensor 38, and a temperature sensor 30. The signal outputs of these sensors are all provided as inputs to controller 22 where they are digitized by one of the analog to digital converters in the controller, processed and stored in the controller memory.

In the present embodiment, the key sensor values that are digitized and stored in memory are those corresponding to output voltage sensor 36 and output current sensor 38. These signals may be considered as first and second control signals and, as discussed below, play a fundamental role during program execution.

The stored value corresponding to the signal output from input voltage sensor 24 (which is also the output voltage of solar array 1) is not used in the present embodiment except as a value that may be monitored (for example by computer 5 communicating with controller 22 through standard RS-232 serial port 34 which forms part of control apparatus 3). If sensor 24 was excluded from the present embodiment, there would be no effect on the operation of SMPS 20 because the stored value corresponding to the signal output from input voltage sensor 24 is not used by any of the algorithms noted above. For this reason, input voltage sensor 24 is shown in broken outline in FIG. 1.

RS-232 serial port 34 is also shown in broken outline in FIG. 1. While the ability to remotely monitor input voltage and other operating conditions via serial port 34 and controller 22 may be considered desirable in some applications, it is not considered essential to the present invention, and could be excluded from controller 3.

Temperature sensor 30 is also shown in broken outline in FIG. 1. If used, temperature sensor 30 serves to provide controller 22 with an input signal corresponding to battery temperature. However, it is not used if load 3 is not a battery. Further, if load 3 is a lead acid battery as in the case of the present embodiment, then temperature sensor 30 remains unnecessary because the Battery MPPT Algorithm discussed below does not include battery temperature as a control parameter. Thus, temperature sensor 30 could be excluded from controller 3 in the present embodiment. However, in the case of some batteries (for example, a nickel cadmium battery), standard charging techniques may be made functionally dependant on battery temperature. Thus, unlike the present Battery MPPT Algorithm, an appropriate algorithm to control battery charging for a different type of battery may very well include battery temperature as a control parameter. In such cases, a temperature sensor like temperature sensor 30 may be used.

Control apparatus 3 also includes a bank of DIP switches 28. In cases where load 3 is a battery, the combined ON-OFF settings of these switches provide controller 22 with a digitally coded representation of characteristic constants that are required during execution of the Battery MPPT Algorithm. In the present embodiment, one such constant is the battery float voltage. Another is the upper limit on battery absorption voltage. In effect, the combined ON-OFF settings of switches 28 can be considered as an integral part of the Battery MPPT Algorithm.

In principle, it will be recognized that the constants represented by any particular combination of DIP switch settings could equally be implemented by specifying the constants directly within the internal programming of controller 22. However, the use of control apparatus 3 then would be undesirably limited to those batteries properly characterized by the specified constants and could not be used with other batteries requiring differing values for such constants.

Control apparatus 3 also includes an LED bar graph display 32. In the present embodiment, this is a multi-color display used when load 2 is a battery. The display has yellow and red sections to indicate low battery voltage levels and a green section to indicate a sufficient battery voltage. Of course, it will be understood that the measured battery voltage will be the voltage sensed by output voltage sensor 36. Display 32 is not considered to be essential. Accordingly, it is shown in broken outline in FIG. 1.

Switch Mode Power Supply 20

Figure 2A:
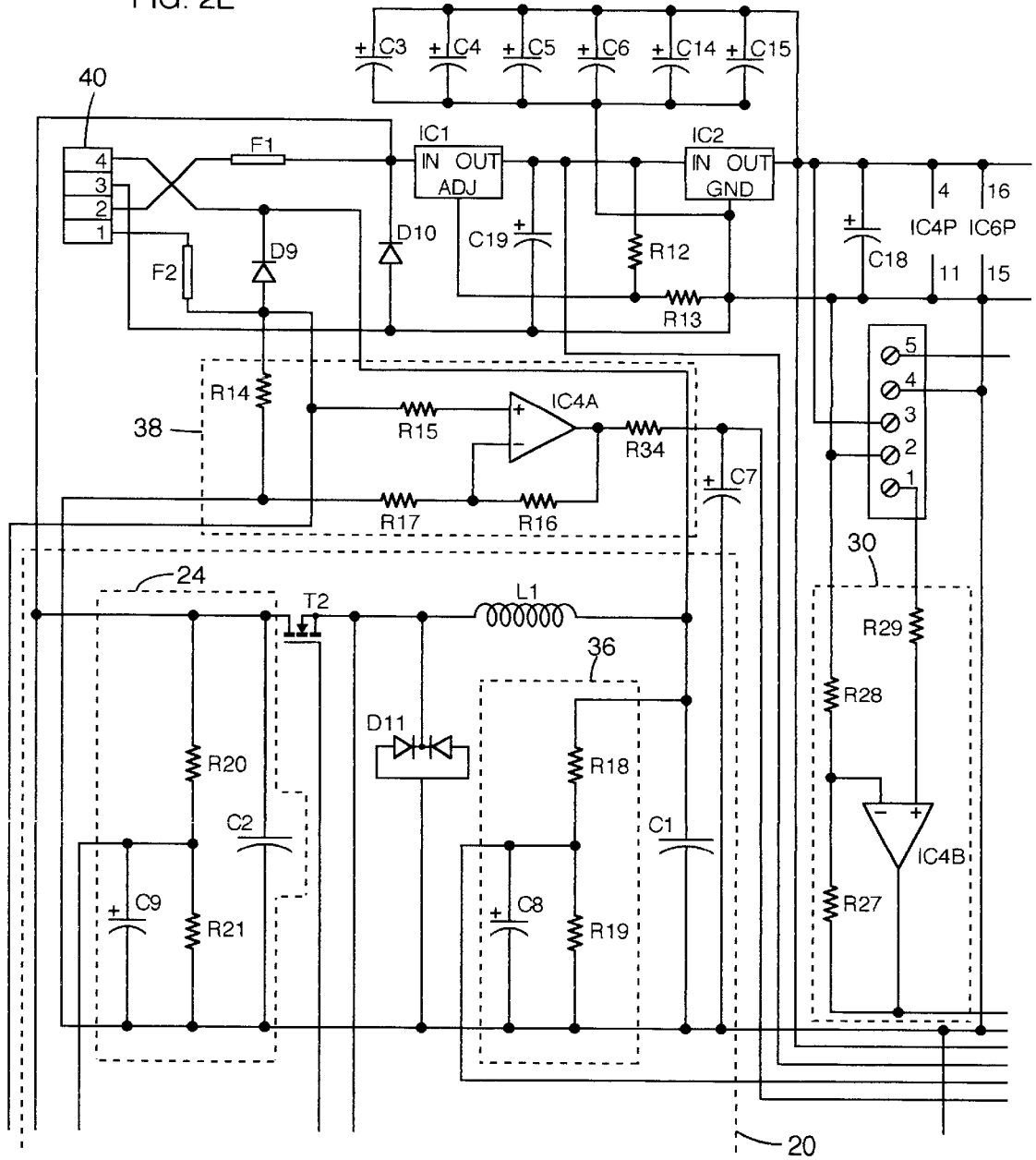
FIG. 2 consisting of FIGS. 2A, 2B, 2C and 2D assembled as shown in FIG. 2E is a circuit diagram of the apparatus shown in FIG. 1.
Figure 2B:
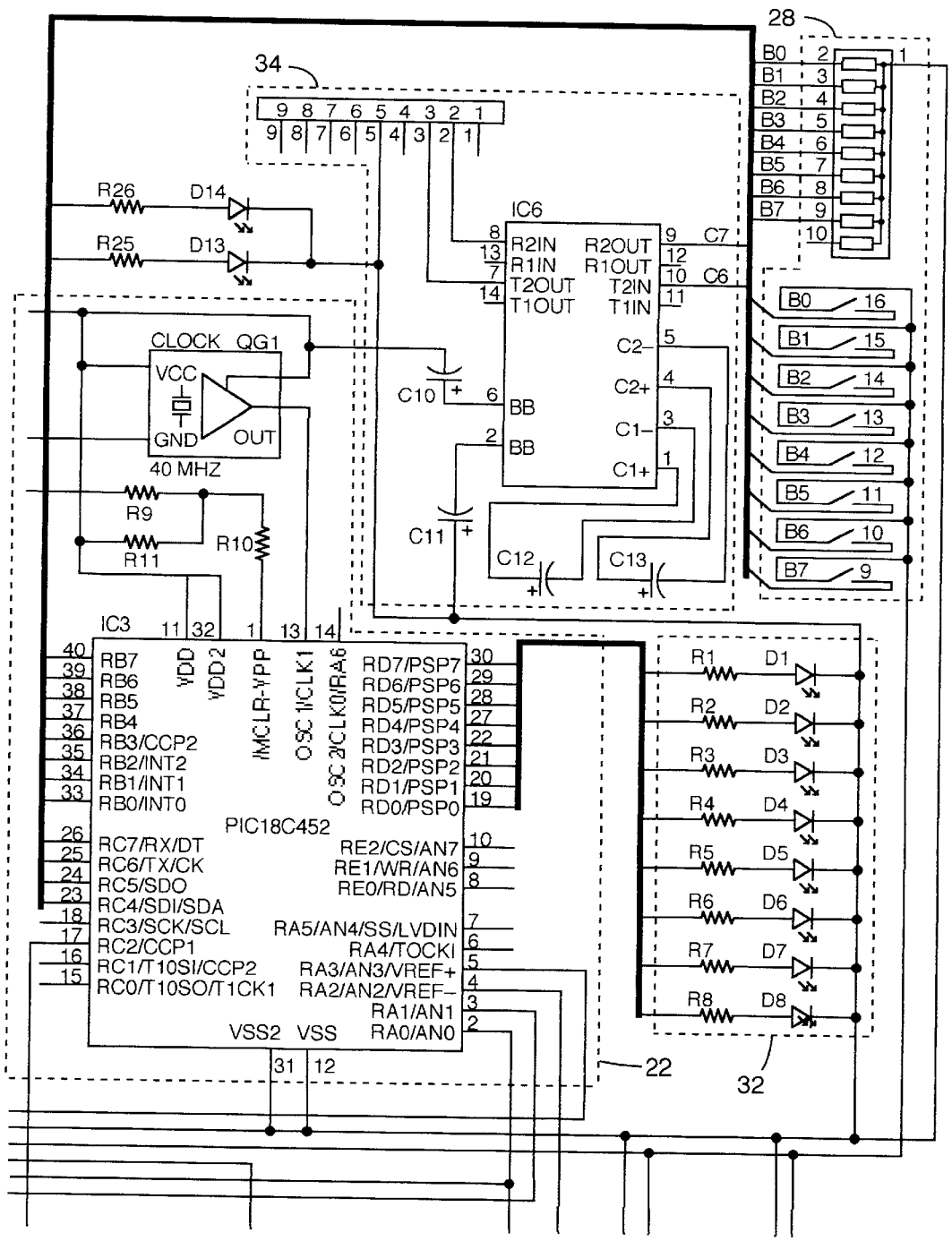
Figure 2C:
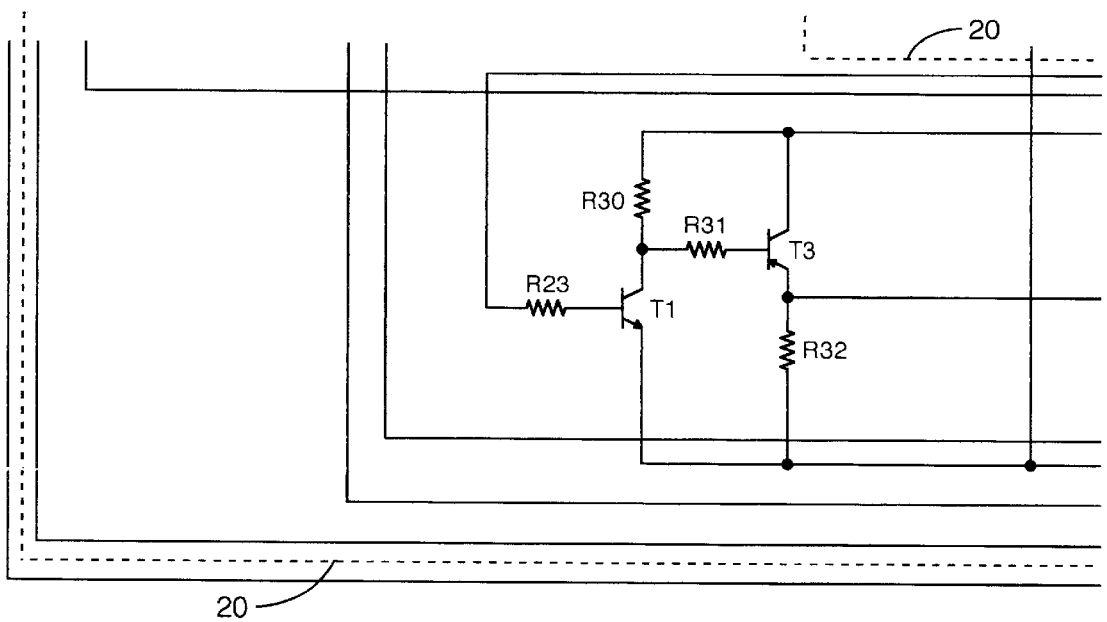
Figure 2D:
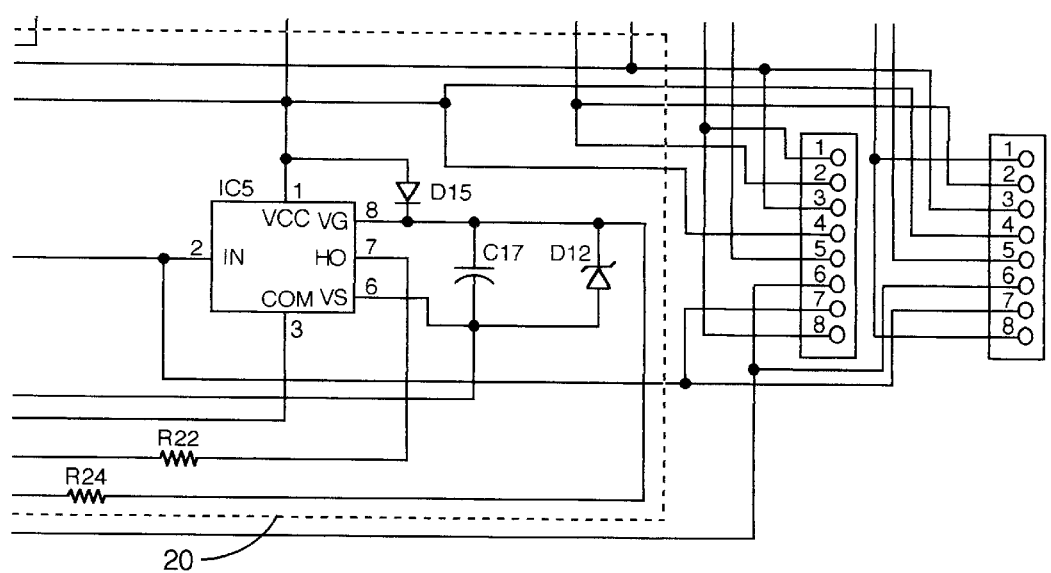

The circuitry of SMPS 20 appears in FIGS. 2A, 2C and 2D within the broken outline border marked 20. In effect, and under the control of controller 22, SMPS 20 acts to modify the apparent impedance of load 2 as seen by solar array 1. Normally, some loads will cause a photovoltaic panel or array such as array 1 to operate below its MPP. SMPS 20 under the control of controller 22 allows a load impedance that would normally create an overload condition to appear as an optimum load for operation at or about the MPP.

The design of SMPS 20 is that of a conventional buck mode power supply which acts like a step down DC—DC transformer, and accordingly will not be described in detail except to note the following:
(a) The principal power handling components (MOSFET T2, capacitors C1, C2, inductor L1 and catch rectifier D11) necessarily should be selected to handle the maximum input and output currents and voltages for which control apparatus 3 is rated. As well, they should be selected bearing in mind the PWM operating frequency at which their properties should be maintained.
(b) Inductor L1 should not saturate at the maximum rated output current.
(c) Capacitors C1, C2 should maintain their properties at the PWM frequency.
(d) That portion of SMPS 20 shown in FIG. 2C (comprising transistors T1, T3 and resistors R23, R30–R32) is a voltage divider which takes the output voltage from controller 22 at pin 17 (FIG. 2B) and scales it to a value compatible with that portion of SMPS 20 shown in FIG. 2D. That portion of SMPS 20 shown in FIG. 2D is a conventional high side driver comprising IC5, capacitor C17, zener diode D12 and resistor R22, the latter of which connects to the base of MOSFET T2. The voltage level shifter and high side driver provide isolation between controller 22 and the power handling circuitry of SMPS 20. Note: Notionally, they can be considered as part of either SMPS 20 or controller 22, or as an interface therebetween.

The input of SMPS 20 is connectable with solar array 1 via terminal block 40 shown in FIG. 2A. Likewise, the output of SMPS 20 is connectable with load 2 via terminal block 40.

In the example of the present embodiment, the frequency of pulse width modulation of SMPS 20, limited by controller 22, was about 39 kilohertz.

Controller 22

As best seen in FIG. 2B, controller 22 comprises a programmable microcontroller IC3 and oscillator or clock QG1 which provides a clock signal to microcontroller IC3. A preferred microcontroller IC3 is the PIC18C452 microcontroller available from Microchip Technology Inc., Chandler, Ariz. Other suitable microcontrollers may be used and adapted to achieve MPPT control in accordance with the present invention, but the PIC18C452 was found to have the following features germane to the present embodiment:

39.06 MHz clock—10 MIPS (clock signal provided by QG1);

Eight 10 analog to digital converters;

10 bit PWM running at 39 kHz;

Addressable USART module;

100 nanosecond cycle time;

A good programming instruction set.

The pinout connections of microcontroller IC3 with other parts of the apparatus shown in FIG. 2 may be summarized as follows:

1 master clear MCLR (reset on/off pin);

2 output voltage from sensor 36 (to a first analog to digital converter in IC3);

3 output current from sensor 38 (to a second analog to digital converter in IC3);

4 input voltage from sensor 24 (to a third analog to digital converter in IC3);

5 temperature from sensor 30 (to a fourth analog to digital converter in IC3);

6–10 no connection;

11, 32 +5 volts;

12, 31 ground;

13 39.06 MHz clock signal from QG1;

17 PWM signal output;

19–22/27–30 to LED bar graph display 32;

23 to D14;

24 to D13;

25 to RS-232 serial port 34 (transmit);

26 from RS-232 serial port 34 (receive);

33–40 from DIP switches 28.

Figure 7A:
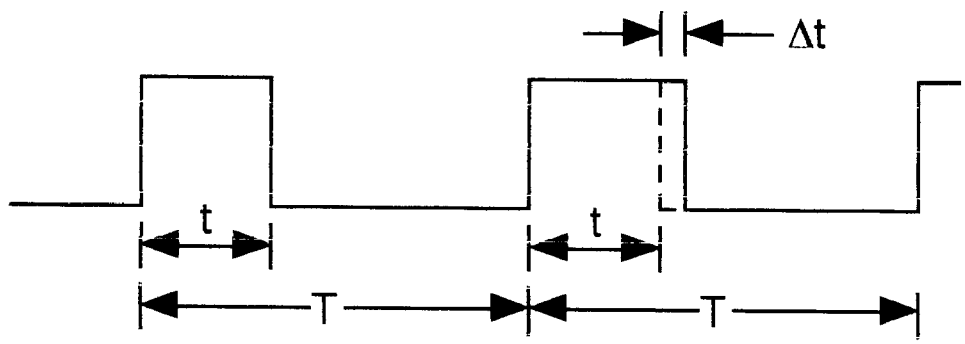
FIG. 7(a) is a representative waveform showing two cycles of PWM output from the controller in FIG. 1 where the pulse width or PWM on-time has increased from once cycle to the next.
Figure 7B:
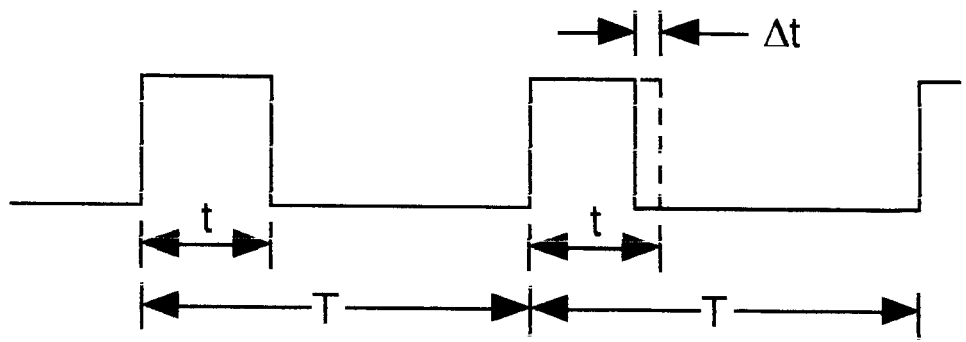
FIG. 7(b) is a representative waveform showing two cycles of PWM output from the controller in FIG. 1 where the pulse width or PWM on-time has decreased from once cycle to the next.

Representative waveforms for the PWM signal output from pin 17 of IC3 are shown in FIGS. 7(a) and 7(b). In these figures, "T" represents the period of the PWM signal (viz. 25.6 $\mu$seconds for the 39.06 MHz clock signal); "t" represents an initial pulse width or PWM on-time, and $\Delta$t represents a perturbation (increase or decrease) in PWM on-time from one pulse width cycle to the next. $\Delta$t is a fixed amount which, in the present embodiment, corresponds to 2 cycles of the clock signal for every pulse width fraction (viz. $2/1024 \times 25.6$ seconds 50 nanoseconds). Note that in FIGS. 7(a) and 7(b) the width of $\Delta$t relative to the width of T is not to scale and has been enlarged for the purpose of illustration.

As shown in FIG. 7(a), PWM on-time has increased from "t" on the initial cycle of PWM output to "t+$\Delta$t" on the next cycle. Conversely, and as shown in FIG. 7(b), PWM on-time has decreased from "t" on the initial cycle of PWM output to "t−$\Delta$t" on the next cycle. Whether PWM on-time is increased or decreased from one cycle to the next depends upon execution of the controller algorithms described below.

Controller Algorithms

Figure 3:
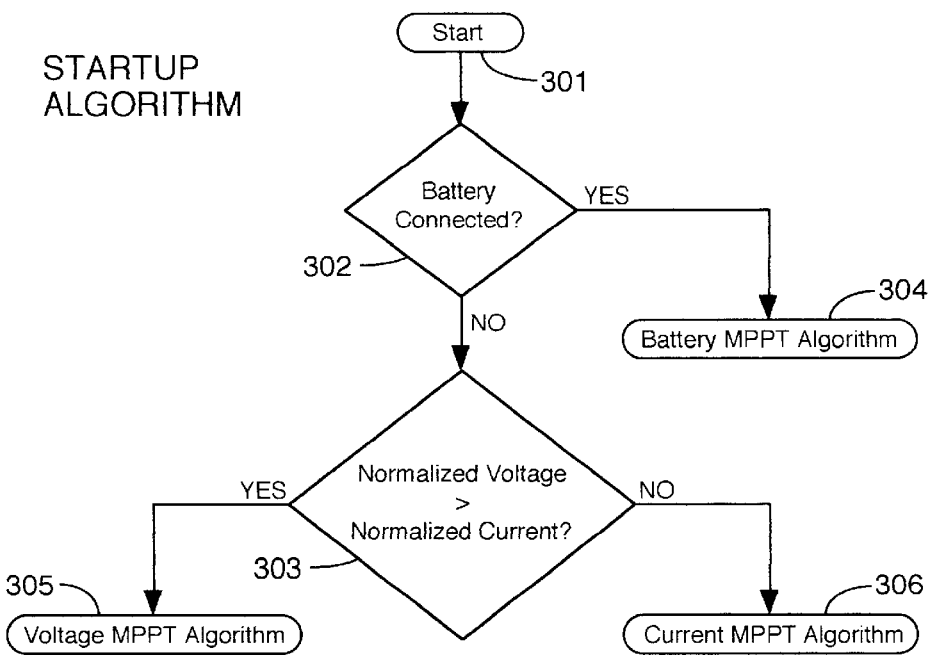
FIG. 3 is a flow chart illustrating a start-up algorithm performed by the controller shown in FIG. 1.
Figure 4:
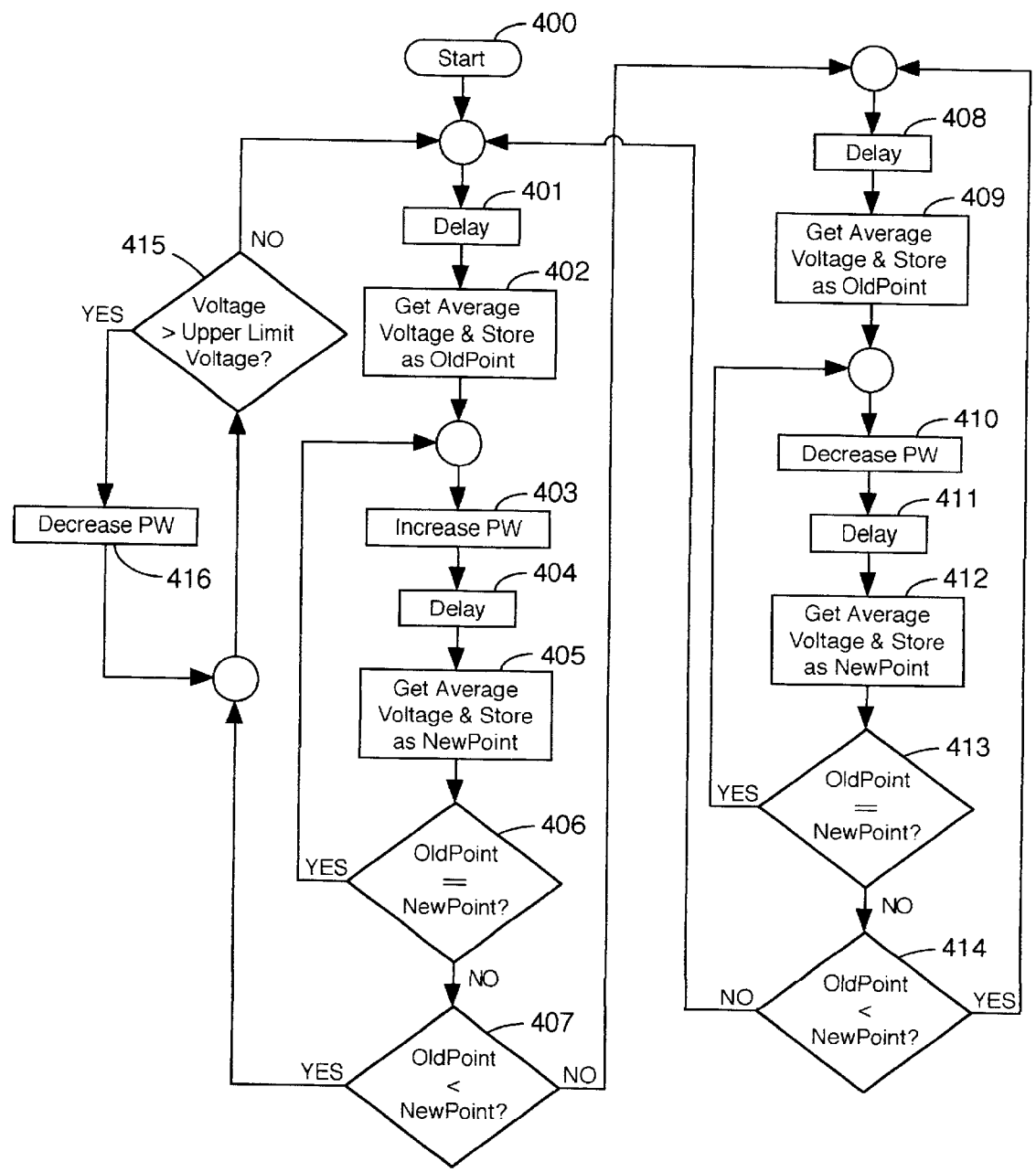
FIG. 4 is a flow chart illustrating an algorithm performed by the controller shown in FIG. 1 for tracking the output voltage of the switch mode power supply shown in FIG. 1.
Figure 5:
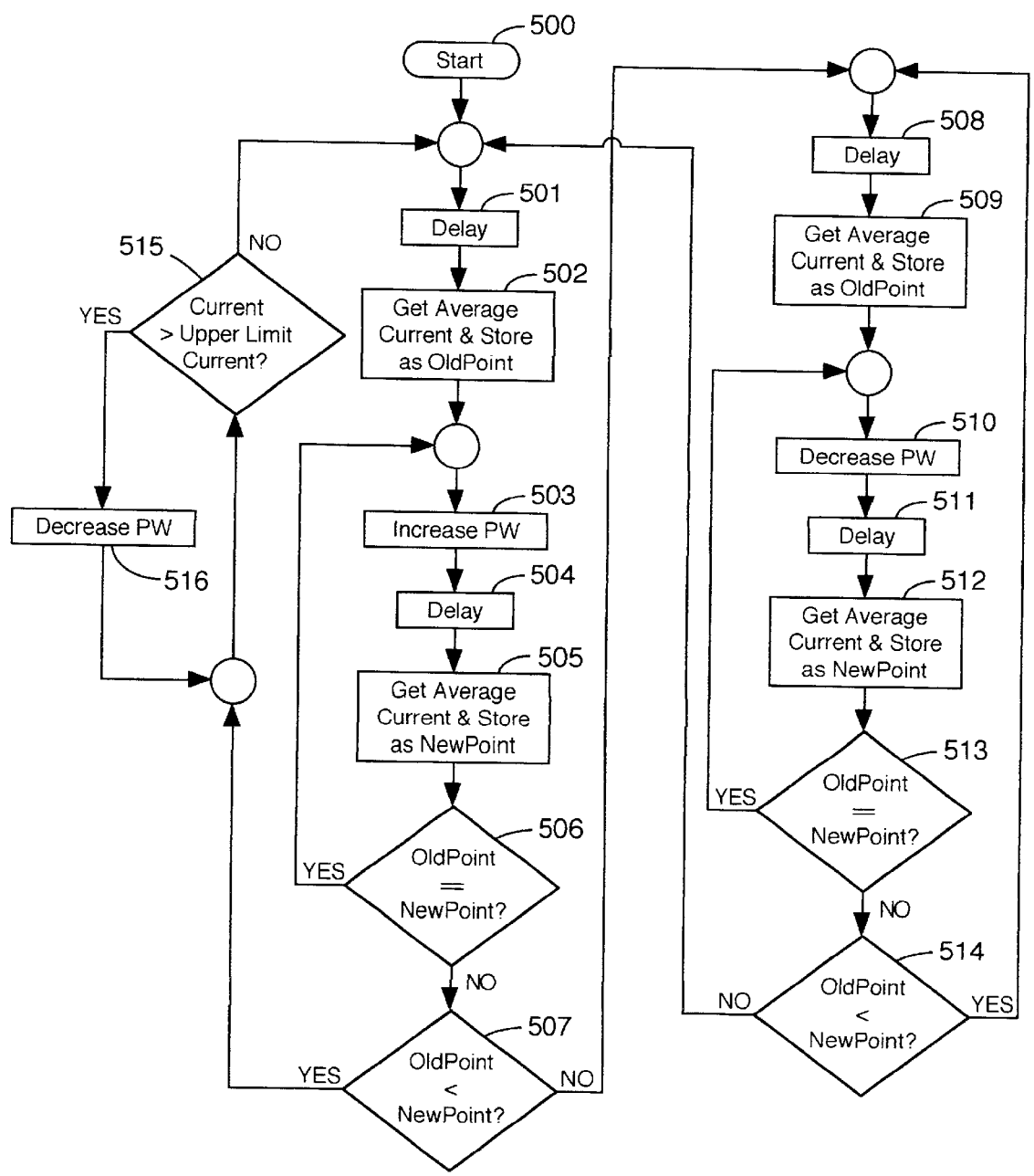
FIG. 5 is a flow chart illustrating an algorithm performed by the controller shown in FIG. 1 for tracking the output current of the switch mode power supply shown in FIG. 1.

Controller 22 is programmed to execute four basic algorithms: the Start-Up Algorithm illustrated by the flow chart of FIG. 3, the Current MPPT Algorithm illustrated by the flow chart of FIG. 4, the Voltage MPPT Algorithm also illustrated by the flow chart of FIG. 4, and the Battery MPPT Algorithm illustrated by the flow chart of FIG. 5.

The Voltage, Current and Battery MPPT Algorithms include "Delay" steps 401, 404, 408, 411, 501, 504, 508, 511, 603, 606, 614 and 617, as the case may be. Each of such delays precedes either a current or voltage measurement and has a programmed duration of about 117 milliseconds. Their purpose is to allow time for any transients in the output of SMPS 20 which might unduly influence the voltage sensed by sensor 36 or the current sensed by sensor 38 to decay. Such transients may arise whenever the output of SMPS 20 changes in response to a perturbation in the PWM signal.

The Voltage, Current and Battery MPPT Algorithms also include "Increase PW" steps 403, 503, 605 and "Decrease PW" steps 410, 510, 616, as the case may be. These are references to a perturbation increase or decrease in the pulse width of the PWM signal as indicated in FIGS. 7($a$) and 7($b$). In each case, the magnitude of the change is "Δt" as discussed above.

(a) Start-Up Algorithm (FIG. 3)

Following Start 301 in FIG. 3, the next step 302 ("Battery Connected?") is to determine whether load 2 is a battery. The answer is provided by the voltage signal from output voltage sensor 36 to controller 22. If the voltage signal from sensor 36 is consistent with that to be expected from a battery, then the Start-Up Algorithm passes control at step 304 to the Battery MPPT Algorithm discussed below. If it is not, then as indicated in FIG. 3 the next step 303 is to determine whether "Normalized Voltage>Normalized Current?".

By definition, the question whether "normalized voltage" is greater than "normalized current" is another way of asking whether the load is a "relatively high impedance load" or a "relatively low impedance load". The question is answered by examining output voltage as measured by sensor 36, output current as measured by sensor 38, normalizing the measured output voltage and current values in relation to the maximum values that SMPS 20 is designed to deliver, then comparing the normalized values. If the normalized value for output voltage is greater than the normalized value for output current (which is indicative of a relatively high output impedance), then the Start-Up Algorithm next passes control at step 305 to the Voltage MPPT Algorithm. Conversely, if the normalized value for output voltage is less than the normalized value for output current (which is indicative of a relatively low output impedance), then the Start-Up Algorithm next passes control at step 306 to the Current MPPT Algorithm.

For example, consider a system where the specified output voltage range of SMPS 20 is 0 to 20 volts and the specified output current range is 0 to 30 amps. If the measured output voltage was actually 12 volts and the measured output current was actually 10 amps, then the normalized voltage on a scale of 1 would be 12/20=0.6 and the normalized current would be 10/30=0.333. Thus, in this example, normalized voltage is greater than normalized current (viz. output impedance is relatively high). Note: In practice, output voltage and current values are normalized within microcontroller IC3 on an integer scale of 1024 rather than a scale of 1. Thus, the normalized value for output voltage becomes 0.6×1024=614; and that for output current becomes 0.333×1024=341. However, when the values are compared, the result necessarily is the same.

As will be seen, output voltage tracking is an integral part of the Voltage MPPT Algorithm. Output current tracking is an integral part of both the Current MPPT Algorithm and the Battery MPPT Algorithm. In effect, the Start-Up Algorithm thus provides a selection means for selecting whether to control SMPS 20 by tracking its output voltage or its output current.

(b) Voltage MPPT Algorithm (FIG. 4)

When the Voltage MPPT Algorithm is in execution, controller 22 tracks output voltage as sensed by voltage sensor 36. In so doing, controller 22 repetitively computes from the sensed signal an average voltage value representative of average voltage at the output of SMPS 20 and compares the average value on each repetition with the average value computed of each immediately preceding repetition. The necessary computations and comparisons are facilitated by digitizing the sensed signals with an analog to digital converter in controller 22, storing measured averages in the memory of controller 22, and performing a programmed comparison of the stored values.

In more detail, the first step following Start 400 in the Voltage MPPT Algorithm is delay step 401, the purpose of which is noted above. Next, at step 402, controller 22 computes from the signal output of voltage sensor 36 (viz. the "first control signal") an average voltage value representative of the average voltage at the output of SMPS 20.

To obtain an average voltage value, controller 22 is programmed to average the magnitude of the control signal as measured at a sequence of data acquisition points. More particularly, at a first data acquisition point, the analog to digital converter in controller 22 connected to sensor 36 will digitize the measured value of the control signal over a sample or data acquisition time of about 35 to 62 $\mu$seconds. The sample value is then stored in the memory of controller 22. Then, following a delay of about 2.14 milliseconds, the measurement is repeated at a second data acquisition point. The sample value at the second data acquisition point is then averaged with the stored value from the first data acquisition point, and the result is then stored in place of the first stored value. Preferably, this process is repeated for at least 6 data acquisition points. The resulting average, stored as "OldPoint", is in the nature of a running average.

The process of averaging has been found to significantly enhance reliability and performance. Without averaging, transients at the output of SMPS 20 can cause unwanted behavior notwithstanding the inclusion of delay time to allow transients to decay. Repeated testing has led to the preference for at least 6 data acquisition points.

To further improve reliability and performance, it has been found desirable to shut down the PWM signal output at pin 17 of IC3 during each period when an average is being taken. Otherwise, undesirable noise signals may be reflected and impair measurements at the output of SMPS 20.

Following step 402, the PWM on-time is increased (viz. by "Δt") at step 403. The result is to increase the voltage at the output of SMPS 20 by a small amount. After delay step 404, the effect of the increase is observed at step 405 which is the same as step 402 except that the resulting average is stored as "NewPoint" for the purpose of comparison with "OldPoint".

A comparison between OldPoint and Newpoint is first performed at step 406 which asks whether OldPoint and NewPoint are equal. If they are equal, then control passes back to step 403. Steps 403 through 406 continue to repeat until such time as OldPoint and NewPoint are found not to be equal.

If OldPoint and Newpoint are not equal at step 406, then control passes to step 407 which asks whether OldPoint is less than NewPoint. If the answer is "YES", then control passes to step 415 which asks whether voltage is greater than an "Upper Limit Voltage".

Step 415 is a protection feature which comes into play in the event that the voltage output of SMPS 20 exceeds its design or rated output. In operation, such an event may rarely occur but, if it does, then control is passed to step 416 which serves to decrease PWM on-time.

In the ordinary case, control will pass from step 415 back to step 401, and steps 401 through 407 as described above will repeat (continually increasing the output voltage of SMPS 20) until such time OldPoint is observed at step 407 to be not less than NewPoint. Then, control passes to delay step 408 followed by step 409, the latter of which gets and stores an OldPoint in the same manner as the same as step 402.

Following step 409, the PWM on-time is decreased (viz. by "Δt") at step 410. The result is to decrease the voltage at the output of SMPS 20 by a small amount. After delay step 411, the effect of the decrease is observed at step 412 which is the same as step 405. Then, OldPoint is compared with NewPoint at step 413. If they are found to be equal, then control passes back to step 410 and steps 410 through 413 continue to repeat until such time as OldPoint and NewPoint are found not to be equal.

If OldPoint and Newpoint are not equal at step 413, then control passes to step 414 which asks whether OldPoint is less than NewPoint. If the answer is "YES", then control passes back to delay step 408, and steps 408 through 414 will repeat (continually decreasing the output voltage of SMPS 20) until such time OldPoint is observed at step 414 to be not less than NewPoint. Then, control will be passed back to delay step 401.

(c) Current MPPT Algorithm (FIG. 5)

The above description with respect to the Voltage MPPT Algorithm applies mutatis mutandis with respect to the Current MPPT Algorithm shown in FIG. 5. The only differences are:

When the Current MPPT Algorithm is in execution, controller 22 tracks output current as sensed by current sensor 38.

Instead of serving to repetitively compute, store and compare voltage values, the Current MPPT Algorithm serves to repetitively compute, store and compare current values (i.e. in FIG. 5, OldPoint and NewPoint are values for current; where the description of the Voltage MPPT reads "voltage", the equivalent description for the Current MPPT Algorithm if fully set out would read "current").

With the foregoing qualifications in mind, steps 500–516 in FIG. 5 may be considered as equivalent to steps 400–416 in FIG. 4. Accordingly, the Current MPPT Algorithm will not be described in further detail.

(d) Battery MPPT Algorithm (FIG. 6)

The Battery MPPT Algorithm shown if FIG. 6 is basically a modified version of the Current MPPT Algorithm. To the extent that it differs from the Current MPPT Algorithm, it will be recognized by those skilled in the art as implementing a standard program routine with standard threshold tests for the charging of a conventional lead battery (e.g. for a nominal 12 volt battery typical values for the "Reset Point" (step 602), "Float Voltage" (step 612) and "Absorption Voltage" (step 613) are 12.5 volts, 13.6 volts and 14.4 volts; a typical time for the time that should be spent (step 611) at the absorption voltage is 1 hour).

It also will be understood by those skilled in the art that differing the Current MPPT Algorithm can readily be adapted to facilitate charging of other batteries other than lead acid batteries. The adaptation required obviously will depend upon the type of battery.

Whether under direction of the Voltage MPPT Algorithm, the Current MPPT Algorithm or the Battery MPPT Algorithm, controller 22 in the present embodiment changes the PWM on-time by a very small amount (e.g. as little as 0.1%) on each perturbation. This process is repeated approximately 100 times per second and leads to very accurate dynamic tracking of the MPP of solar array 1. Such tracking is generally immune to solar shading effects, temperature change and irradiance level change.

Various modifications and changes to the embodiment that has been described can be made without departing from the scope of the present invention, and will undoubtedly occur to those skilled in the art. The invention is not to be construed as limited to the particular embodiment and should be understood as encompassing all those embodiments that are within the spirit and scope of the claims that follow.

We claim:

1. Apparatus for regulating the delivery of power from a DC power source to a load, said apparatus comprising:
   (a) a switch mode DC—DC power supply controllable in response to a pulse width modulation (PWM) signal having a controllable PWM on-time, said power supply comprising:
      (i) an input connectable with said source for receiving power from said source;
      (ii) an output connectable with said load for delivering power to said load; and,
      (iii) a PWM input for receiving said PWM signal;
   (b) a voltage sensor operatively connected to the output of said power supply for sensing output voltage and for providing a first control signal corresponding to the voltage sensed;
   (c) a current sensor operatively connected to the output of said power supply for sensing output current and for providing a second control signal corresponding the current sensed;
   (d) means for determining whether said load is one of:
      (i) a battery,
      (ii) if not a battery, a relatively low impedance load or a relatively high impedance load; and,
   (e) a controller operatively connected to said PWM input and to said sensors for receiving said first and second control signals and for providing said PWM signal to said power supply, said controller comprising:
      (i) selection means for selecting whether to control said power supply by tracking said output voltage or by tracking said output current;
      (ii) signal processing means for repetitively computing from said first control signal an average voltage value representative of average voltage at said output of said power supply;
      (iii) means for comparing said average voltage value as computed on each repetition with said average voltage value as computed on each immediately preceding repetition;
      (iv) signal processing means for repetitively computing from said second control signal an average current value representative of average current at said output of said power supply;
      (v) means for comparing said average current value as computed on each repetition with said average current value as computed on each immediately preceding repetition;

(vi) means responsive when said selection means has selected output voltage tracking for increasing said PWM on-time if said average voltage value as computed on a given repetition is greater than said average voltage value as computed on an immediately preceding repetition, and for decreasing said PWM on-time if said average voltage value as computed on a given repetition is less than said average voltage value as computed on an immediately preceding repetition;

(vii) means responsive when said selection means has selected output current tracking for increasing said PWM on-time if said average current value as computed on a given repetition is greater than said average current value as computed on an immediately preceding repetition, and for decreasing said PWM on-time if said average current value as computed on a given repetition is less than said average current value as computed on an immediately preceding repetition;

(viii) means for computing from said first control signal a first normalized value representative of said output voltage;

(ix) means for computing from said second control signal a second normalized value representative of said output current; and, (x) means for comparing said first and second normalized values, and wherein:

if said load is a battery, said selection means is operative to select output current tracking; and, if said load is not a battery, said selection means is responsive to said comparison of said first and second normalized values to select output voltage tracking if said first normalized value is greater than said second normalized value and to select output current tracking if said first normalized value is less than said second normalized value.

2. Apparatus as defined in claim 1 wherein said selection means is operative to select:

(a) output current tracking if said load is a battery or a relatively low impedance load, (b) output voltage tracking if said load is a relatively high impedance load.

3. Apparatus for regulating the delivery of power from a DC power source to a load, said apparatus comprising:

(a) a switch mode DC—DC power supply controllable in response to a pulse width modulation (PWM) signal having a controllable PWM on-time, said power supply comprising:
  (i) an input connectable with said source for receiving power from said source;
  (ii) an output connectable with said load for delivering power to said load; and,
  (iii) a PWM input for receiving said PWM signal;

(b) a voltage sensor operatively connected to the output of said power supply for sensing output voltage and for providing a first control signal corresponding to the voltage sensed;

(c) a current sensor operatively connected to the output of said power supply for sensing output current and for providing a second control signal corresponding the current sensed; and, (d) a controller operatively connected to said PWM input and to said sensors for receiving said first and second control signals and for providing said PWM signal to said power supply, said controller comprising:
  (i) selection means for selecting whether to control said power supply by tracking said output voltage or by tracking said output current;
  (ii) signal processing means for repetitively computing from said first control signal an average voltage value representative of average voltage at said output of said power supply;
  (iii) means for comparing said average voltage value as computed on each repetition with said average voltage value as computed on each immediately preceding repetition;
  (iv) signal processing means for repetitively computing from said second control signal an average current value representative of average current at said output of said power supply;
  (v) means for comparing said average current value as computed on each repetition with said average current value as computed on each immediately preceding repetition;
  (vi) means responsive when said selection means has selected output voltage tracking for increasing said PWM on-time if said average voltage value as computed on a given repetition is greater than said average voltage value as computed on an immediately preceding repetition, and for decreasing said PWM on-time if said average voltage value as computed on a given repetition is less than said average voltage value as computed on an immediately preceding repetition; and,
  (vii) means responsive when said selection means has selected output current tracking for increasing said PWM on-time if said average current value as computed on a given repetition is greater than said average current value as computed on an immediately preceding repetition, and for decreasing said PWM on-time if said average current value as computed on a given repetition is less than said average current value as computed on an immediately preceding repetition;

wherein:

said signal processing means for repetitively computing said average voltage value comprises means for averaging the values of said first control signal as measured at a first sequence of data acquisition points; and, said signal processing means for repetitively computing said average current value comprises means for averaging the values of said second control signal as measured at a second sequence of data acquisition points.

4. Apparatus as defined in claim 3, wherein:

(a) said first sequence of data acquisition points comprises a sequence of at least six data acquisition points; and, (b) said second sequence of data acquisition points comprises a sequence of at least six data acquisition points.

* * * * *